United States Patent
Tambornino

(10) Patent No.: US 6,533,308 B1
(45) Date of Patent: Mar. 18, 2003

(54) FAIL SAFE RETRACTABLE HITCH

(76) Inventor: Curt Tambornino, 1451 E. Park Creek Rd., Fall Creek, WI (US) 54742

( * ) Notice: Subject to any disclaimer, the term of this patent is extended or adjusted under 35 U.S.C. 154(b) by 0 days.

(21) Appl. No.: 09/941,083

(22) Filed: Aug. 28, 2001

(51) Int. Cl.[7] .............................................. B62D 53/08
(52) U.S. Cl. .................................... 280/491.1; 280/901
(58) Field of Search .......................... 280/490.1, 491.1, 280/491.2, 491.5, 901, 511

(56) References Cited

U.S. PATENT DOCUMENTS

| | | | |
|---|---|---|---|
| 3,659,876 A | 5/1972 | Melton | 280/511 |
| 3,856,330 A * | 12/1974 | Baxter et al. | 280/416.1 |
| 3,893,713 A | 7/1975 | Ivy | 280/511 |
| 3,989,270 A | 11/1976 | Henderson | 280/478 |
| 4,125,272 A | 11/1978 | Putnam, Jr. et al. | 280/478 |
| 4,186,940 A | 2/1980 | Pillars | 280/507 |
| 4,256,324 A | 3/1981 | Hamilton | 280/433 |
| 4,540,194 A | 9/1985 | Dane | 280/491 |
| 4,546,994 A | 10/1985 | Taylor | 280/423 |
| 4,570,966 A | 2/1986 | Giboney et al. | 280/433 |
| 4,657,274 A | 4/1987 | Mann et al. | 280/433 |
| 4,678,199 A | 7/1987 | Dickmann | 280/491 |
| 4,921,266 A | 5/1990 | Beals | 280/415 |
| 5,016,898 A | 5/1991 | Works et al. | 280/433 |
| 5,104,138 A | 4/1992 | Allen | 280/433 |
| 5,738,363 A * | 4/1998 | Larkin | 280/417.1 |
| 5,755,452 A | 5/1998 | Tambornino | 480/415.1 |
| 5,860,671 A | 1/1999 | MacKeown | 280/511 |
| 5,893,575 A | 4/1999 | Larkin | 280/491.1 |
| 5,906,387 A | 5/1999 | Wallace | 280/491.3 |
| 6,409,202 B1 * | 6/2002 | Putnam | 280/495 |
| 6,447,000 B1 * | 9/2002 | Dick et al. | 280/491.5 |

* cited by examiner

*Primary Examiner*—Kevin Hurley
(74) *Attorney, Agent, or Firm*—Kinney & Lange, P.A.

(57) ABSTRACT

A retractable hitch is adapted to be mounted to a vehicle, such as in the bed of a pickup truck. The hitch includes a ball piece for releasable engagement with a coupling mechanism secured to a trailer as known in the art. The hitch has a frame secured to the vehicle, and the frame provides a substantially flat upper surface with a sleeve opening extending below the upper surface. The ball piece moves in the sleeve between an operative position, wherein it extends above the upper surface, and a retracted position wherein the ball piece is positioned below the upper surface. A raising/lowering control moves the ball piece within the sleeve. The raising/lowering control is mechanically coupled to the ball piece with a raising/lowering control linkage, which accesses the ball piece through a bottom and a vertically extending slot in the sleeve. The raising/lowering control linkage contacts a bottom bearing surface of the ball piece to raise the ball piece upward. A spring assists in raising the ball piece upward. A locking control having a horseshoe shaped locking pin is used for selectively locking the ball piece in the operative position or in the retracted position. Operation of the raising/lowering control linkage involves only translational movement which can be quickly accomplished from the wheel well of the vehicle.

20 Claims, 5 Drawing Sheets

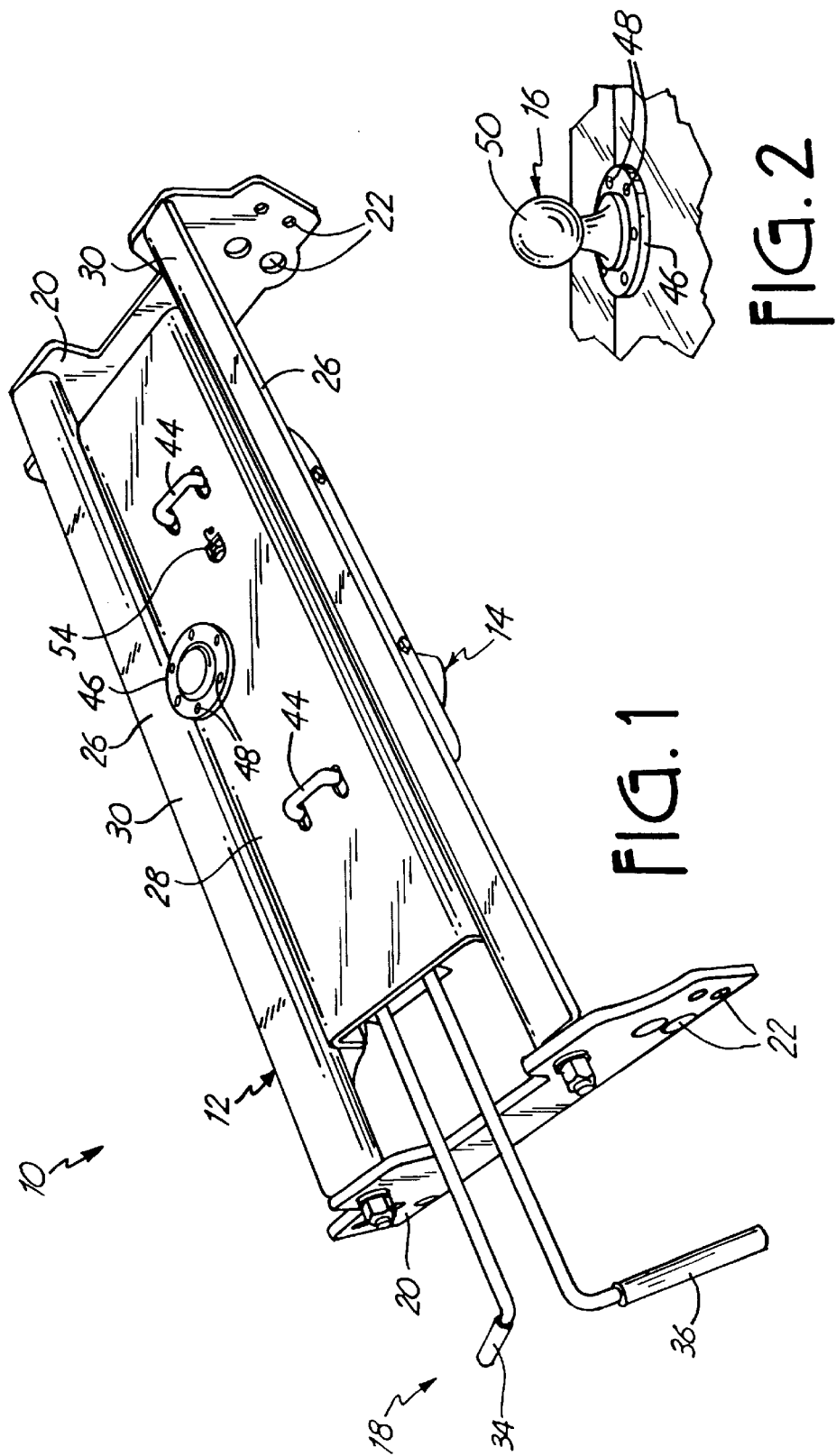

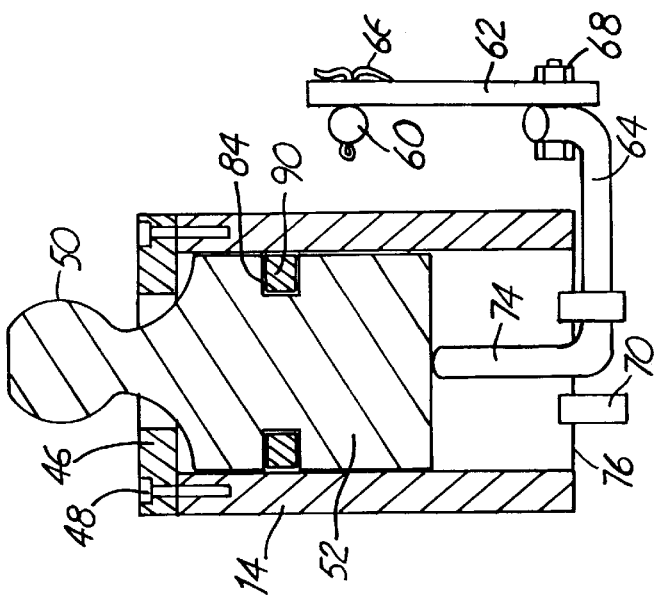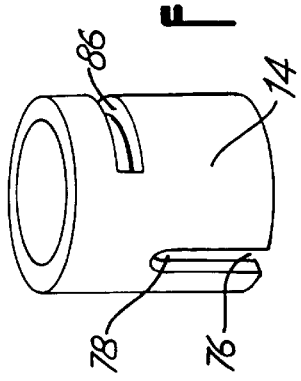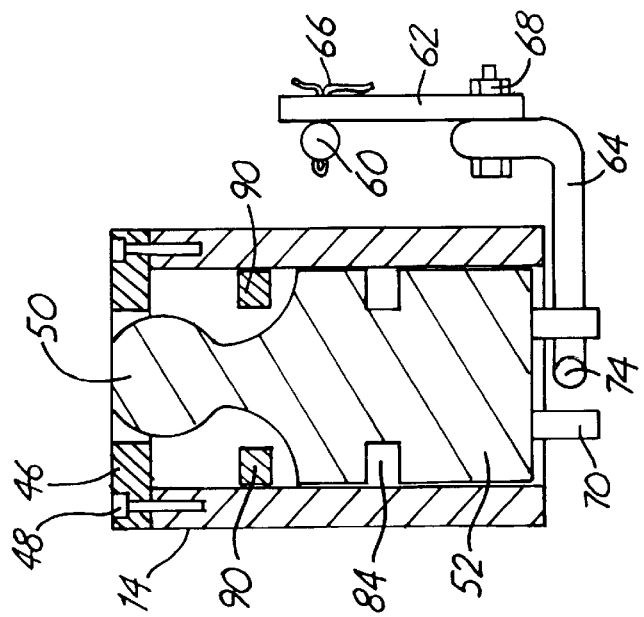

FAIL SAFE RETRACTABLE HITCH

CROSS-REFERENCE TO RELATED APPLICATION(S)

None.

BACKGROUND OF THE INVENTION

The present invention relates to trailer hitches such as ball hitches supporting a trailer from the rear of a towing vehicle, and more particularly to retractable trailer hitches, which move between an extended position during use and a retracted position beneath a surface or bed of the vehicle when not in use for loading items into the bed without interference from the retractable hitch.

Hitch balls and ball hitches of the prior art for gooseneck type trailers are usually bolted, permanently mounted, or welded to the bed of pickup trucks or similar vehicles. If the hitch ball is in the upright position above the surface of the pickup bed, it is difficult to lay large items flat on the floor of the pickup bed, which creates potential damage to other cargo or renders one third or more of the flattened floor space unusable. Furthermore, the hitch ball can be hazardous to mobility within the pickup bed.

Various types of retractable hitches exist in the past. For instance, U.S. Pat. Nos. 3,385,611, 4,256,324, 4,540,194, 4,570,966, 4,657,274, 5,755,452, 5,860,671, 5,893,575 and 5,906,387 all disclose various types of retractable hitches.

Retractable hitches have numerous desired operational characteristics. In general, retractable trailer hitches have to be strong to support the vertical weight (or, depending upon loading, in some instances lift) of the trailer tongue, as well as the horizontal drag or towing force for the trailer. Retractable hitches should be made reliable to work on a consistent basis. Operational control between a retracted position and an extended position should be as simple as possible, but should also be as "fail-safe" as possible to prevent inadvertent or unwanted retraction. The operation must also be robust so as to work over an extended period of time despite the often hazardous, dirty or corrosive conditions that trailer hitches may be subjected to over years of use. Repair of such trailer hitches should also be made simple and efficient. The present invention seeks to fulfill all of these various desired operational characteristics, without many of the drawbacks of prior art retractable trailer hitches.

BRIEF SUMMARY OF THE INVENTION

The present invention involves a retractable hitch adapted to be mounted to a vehicle, such as in the bed of a pickup truck. The hitch includes a ball piece for releasable engagement with a coupling mechanism secured to a trailer as known in the art. The hitch has a frame secured to the vehicle, and the frame provides a substantially flat upper surface with an opening extending below the upper surface. The ball piece moves between an operative position, wherein it extends above the upper surface, and a retracted position wherein the ball piece is positioned below the upper surface. A raising/lowering control moves the ball piece between the operative position and the retracted position. The raising/lowering control is mechanically coupled to the ball piece through a raising/lowering control linkage. The raising/lowering control linkage is positioned so as to allow substantially unimpeded access to the ball piece in the operative position for the engaged coupling mechanism on the trailer. In one aspect, operation of the raising/lowering control linkage involves only translational movement which can be quickly accomplished. A locking control is used for selectively locking the ball piece in the operative position. The locking control is mechanically coupled to the ball piece through a locking control linkage positioned so as to allow substantially unimpeded access to the ball piece in the operative position for the engaged coupling mechanism on the trailer.

BRIEF DESCRIPTION OF THE DRAWINGS

FIG. 1 is a perspective view of the trailer hitch according to the present invention, shown in the retracted position.

FIG. 2 is a perspective view of the trailer hitch of FIG. 1, shown in the extended position.

FIG. 6 is a perspective view of the sleeve for use in the trailer hitch of FIG. 1.

FIG. 7 is a cross sectional view of the sleeve and trailer hitch in the retracted position.

FIG. 8 is a cross sectional view of the sleeve and trailer hitch in the extended position.

Figure 3:
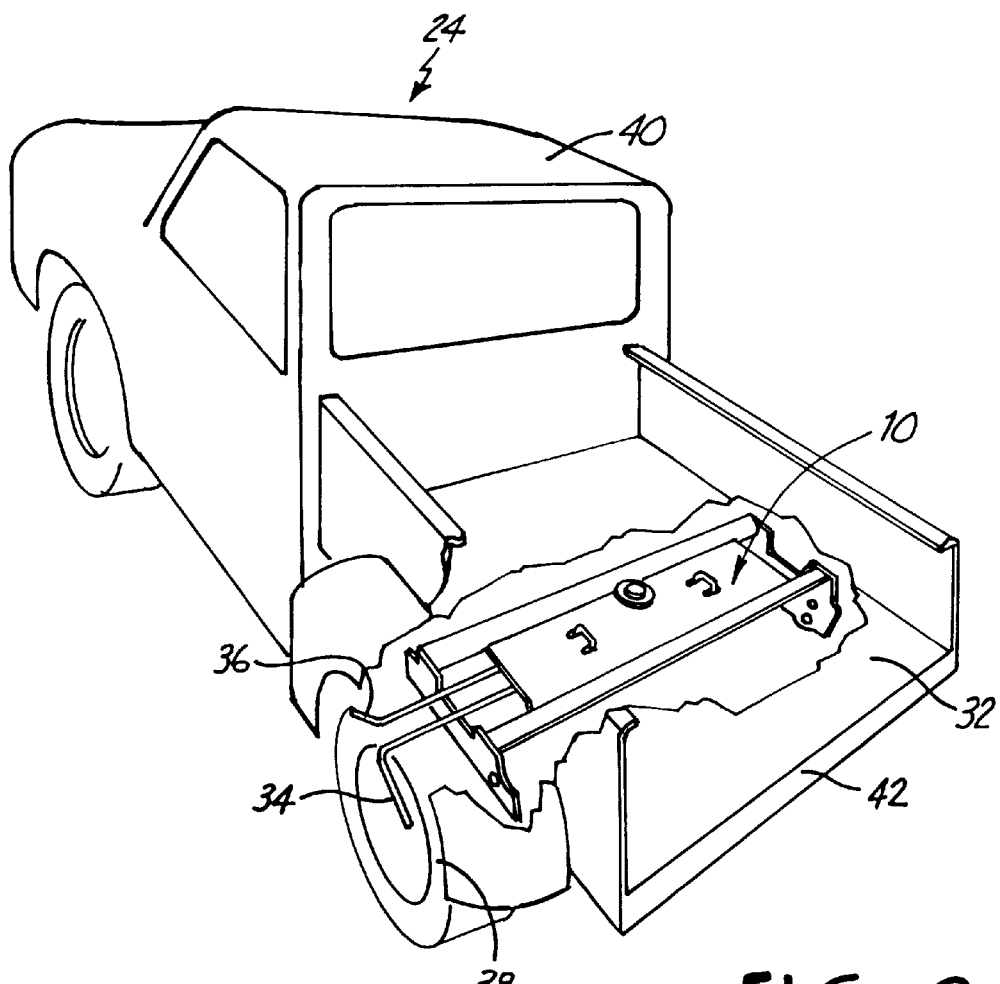
FIG. 3 is a perspective view of the trailer hitch of the preferred embodiment, installed in the bed of a pickup truck for use with a fifth wheel or goose neck trailer.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

As shown in FIGS. 1 and 2, the preferred trailer hitch 10 generally includes a support frame 12, a sleeve 14, a ball piece 16, and a control mechanism 18. The support frame 12 preferably includes first and second (right/left) side mounting plates or brackets 20. The side mounting brackets 20 may include recesses or holes 22 to facilitate mounting of the trailer hitch 10 to the frame of a vehicle 24. In the preferred embodiment, the mounting brackets 20 are configured to extend generally vertically. The positions of the holes 22 in the mounting brackets 20 are selected to match preexisting holes (not shown) in the pickup frame.

The support frame 12 also includes first and second (front/rear) transverse rails 26 extending between the side mounting brackets 20. The transverse rails 26 may be welded or otherwise fixed to the side mounting brackets 20. The transverse rails 26 provide a joist arrangement to the support frame 12 which adds strength to the support frame 12 so that the support frame 12 can amply support the vertical and horizontal loads of the towed trailer.

In the preferred embodiment, a bed plate 28 extends to provide a generally horizontal surface between the transverse rails 26. The bed plate 28 may be welded or otherwise fixed to the transverse rails 26. Tops 30 of the transverse rails 26 together with the bed plate 28 provide the exposed surface for the trailer hitch 10. The transverse rails 26 and the bed plate 28 thus provide an exposed, upper surface which is substantially flat for loading of the vehicle 24 over the retracted hitch 10. Like the transverse rails 26, the bed plate 28 should also be quite strong. While the transverse rails 26 largely support the vertical and horizontal loads of the towed trailer, the bed plate 28 may support significant loads such as when a person is standing with his or her feet on the bed plate 28 during loading of the pickup bed 32 or attaching of the trailer to the trailer hitch 10. In the preferred embodiment, the mounting brackets 20, the transverse rails 26 and the bed plate 28 are all formed of structural metal, such as steel at about 3/8 or 1/2 inch plate thickness. The mounting brackets 20, the transverse rails 26 and the bed plate 28 are all preferably securely fixed together by welding.

When disposed in a fifth-wheel goose neck mounting arrangement as shown in FIG. 3, a hole is cut in the bed 32 of a pickup truck 24. The mounting brackets 20 are secured to the vehicle frame such as with bolts, at a height such that the transverse rails 26 and the bed plate 28 extend within the elevational plane of the pickup truck bed 32 in a flat manner. With the ball piece 16 in the retracted position, the trailer hitch 10 provides part of the flat surface of the bed 32 of the pickup truck 24 for carrying cargo.

The trailer hitch 10 can be mounted as shown in FIG. 3, with handles 34, 36 of the control mechanism 18 extending into the right (passenger-side) rear wheel well 38 of the vehicle 24. However, the trailer hitch 10 can alternatively be mounted in an opposite orientation, with handles 34, 36 of the control mechanism 18 extending into the left (driver-side) rear wheel well of the vehicle 24. If desired for particular installations, the trailer hitch 10 could be mounted in other orientations, such as with the handles 34, 36 toward the cab 40 of the vehicle 24 or off the rear bumper 42. By positioning the handles 34, 36 of the control mechanism 18 in the wheel well 38, the control handles 34, 36 are spaced from the ball piece 16 by an unimpeded access distance so there is never any interference between the trailer neck and the controls handles 34, 36.

Two chain retention hooks 44 may be disposed on opposite sides of the ball location. The chain retention hooks 44 may be spring mounted as known in the art. The chain retention hooks 44 are used to secure the chains of the gooseness hitch receiver (not shown). As known in the art, the chain retention hooks 44 enable a user to secure a backup chain to the hitch 10 to prevent complete separation in the event the ball hitch connection disengages.

As shown in FIGS. 1 and 2, the preferred hitch 10 includes a retaining collar 46. The retaining collar 46 is secured at the top of the sleeve 14, shown in part in FIG. 1 and better shown in FIGS. 4–8. The retaining collar 46 and the vertically extending sleeve 14 define an opening extending below the bed plate 28 which receives the ball piece 16. In the preferred embodiment, the retaining collar 46 is removable from the sleeve 14 with the use of commonly available tools. For instance, the retaining collar 46 may be attached to the sleeve 14 with threaded bolts 48. Bolt receiving holes are preferably countersunk or recessed into the retaining collar 46. The bolts 48 may include an allen-type or other type screw head to enable removal with appropriate tools.

The retaining collar 46 has the vertical thickness which matches the size of corrugations on the bed 32 of the pickup truck 24. In this way, when the ball piece 16 is in the retracted position, the top of the retaining collar 46 provides no interference for cargo placed in the pickup bed 32.

The preferred ball piece 16 has a spherically-shaped ball 50 on top of a cylindrically-shaped shank 52. The use of spherically-shaped balls for releasably engaging a coupling mechanism secured to a trailer is well known in the art. Workers skilled in the art will appreciate that the ball 50 could alternatively be of other shapes to form a mating relationship with any shape of coupling mechanism of the trailer used, and the use of the term "ball" and "ball piece" as used herein is not limited to spherical shapes.

The cylindrical shape of the shank 52 provides a simple bearing relationship with the sleeve 14. The sleeve 14 cooperates with the shank 52 to act as an alignment guide for the ball piece 16. The cylindrical shape of the sleeve 14 and shank 52 also permit the ball piece 16 to rotate. Thus, the shank 52 defines a shank axis which is substantially vertical when the ball piece 16 is in the operative position, and such that the ball 50 is rotatable about the shank axis in the operative position. Workers skilled in the art will appreciate that the shank 52 of the ball piece 16 could also be differently shaped, such as a rectangular shape mating with a rectangularly-shaped sleeve.

The ball piece 16 of the hitch 10 is preferably integrally formed of a single piece of steel. In the preferred embodiment, the ball piece 16 is received in the sleeve 14 in a sliding relationship, but is not attached to the sleeve 14 or any other part of the hitch 10 in any fixed fashion. The inner diameter of the retaining collar 46 is larger than the outer diameter of the spherically-shaped ball 50, but is preferably smaller than the outer diameter of the shank 52. Thus, while the retaining collar 46 is secured to the sleeve 14, the shank 52 is contained within the sleeve 14 and the ball piece 16 cannot be removed. However, nothing restricts the ball piece 16 from rotating about a vertical axis, such as when the trailer moves from side to side during turning of the vehicle 24. When the retaining collar 46 is removed from the sleeve 14, the ball piece 16 can be raised and removed from the sleeve 14 without any further disengagement. Thus, in instances where a different ball piece is desired, such as if the ball piece 16 becomes damaged and requires replacement or when a different size or shaped ball piece is to be used, changing of the ball piece is simple and straightforward.

A spring attachment location 54 may be formed into the bed plate 28. The spring attachment location 54 is used with the raise-assist spring 56 in the control mechanism 18, described below with respect to FIG. 4.

The control mechanism 18 includes two control handles 34, 36 which extend laterally out of the side support bracket 20 of the hitch 10. As shown in FIG. 3, these handles 34, 36 are preferably received such as in the wheel well 38 of the pickup truck 24. In this mounting location, the handles 34, 36 are easily accessed from outside of the vehicle 24 without interfering with the operation of the vehicle 24 or bed 32. At the same time, the wheel well location shields the handles 34, 36 while the vehicle 24 is in use, so the handles 34, 36 are not inadvertently moved during use of the vehicle 24, and so the handles 34, 36 cannot poke into anything or be bent through operation of the vehicle 24.

Figure 4:
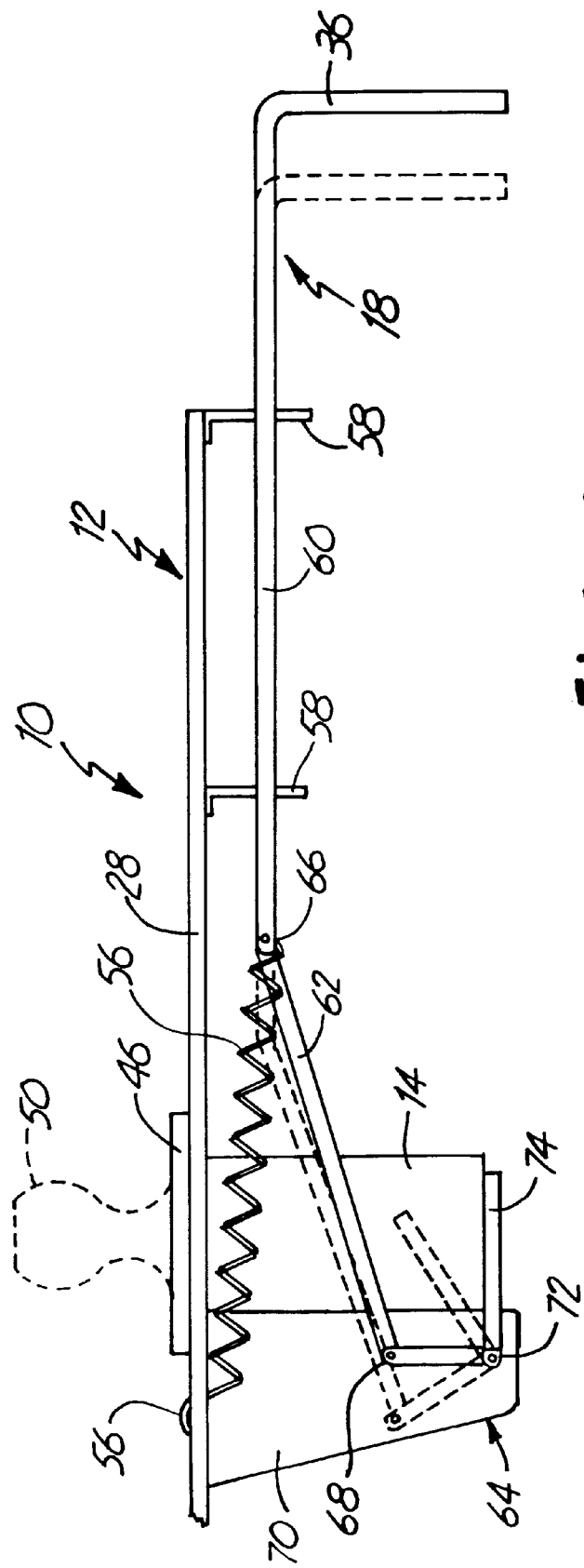
FIG. 4 is a side view of the extension mechanism of the preferred embodiment, showing the extended position in dashed lines.

The use of the handles 34, 36 to move the ball piece 16 between an extended and retracted position is exemplified by comparing FIGS. 1 and 2, by comparing the solid line position to the dashed line position in FIG. 4, and by comparing FIGS. 7 and 8. The ball piece 16 of the hitch 10 is disposed within the sleeve 14 and retractably mounted between an extended position (FIGS. 2, 3 and 8) and a recessed position (FIGS. 1 and 7). In the extended position, the ball piece 16 can releasably engage a coupling mechanism secured to a trailer.

The handles 34, 36 include a positive lock handle 34 and a raising/lowering handle 36. If desired, the two handles 34, 36 may be color coded or otherwise marked so a user can readily distinguish between them. With the positive lock handle 34 and the raising/lowering handle 36, a user standing at the handles 34, 36 can selectively move the ball 50 of the hitch 10 between the extended, operative position and the recessed, retracted position and lock the ball 50 in the selected position. The linkage between the handles 34, 36 and the ball piece 16 is disposed below the bed plate 28 and the transverse rails 26, so as to allow substantially unimpeded access to the ball 50 in the operative position for the engaged coupling mechanism on the trailer.

The control mechanism 18 for raising and/or lowering of the ball piece 16 of the hitch 10 is best exemplified by FIG. 4. The raising/lowering handle 36 is supported in a sliding relationship to the support frame 12 such as through two vertically extending bearing plates 58. Each bearing plate 58 has a circular hole which receives the bar 60 of the raising/lowering handle 36. The bearing plates 58 may be fixed to the bed plate 28 and/or transverse rails 26 such as by welding.

The bar 60 is part of a mechanical linking arrangement between the raising/lowering handle 36 and the ball piece 16. In the preferred embodiment, this linking mechanism includes an intermediate link 62 and an L-hoist 64. The intermediate link 62 is secured to the rod 60 of the raising/lowering handle 36 such as with a pin attachment 66. At the opposite end of the intermediate link 62, the intermediate link 62 is secured to the L-hoist 64 with a similar pin attachment 68. The pin attachments 66, 68 allow pivotal movement of the intermediate link 62 with respect to both the raising/lowering handle 36 and the L-hoist 64.

A vertically extending support 70 is provided on the support frame 12, on the far side of the sleeve 14. The vertically extending support 70 may be secured to the bed plate 28 and/or transverse rails 26 and/or sleeve 14 such as by welding. The vertically extending support 70 includes a pivot location 72 which receives and pivotally supports the L-hoist 64. A raising leg 74 of the L-hoist 64 extends and is in contact with a bottom surface of the ball piece 16. By sliding motion of the raising/lowering handle 36, the intermediate link 62 moves to pivot the L-hoist 64 relative to its pivot location 72 of the vertically extending support 70. By pivoting the L-hoist 64 about its pivot location 72, the raising leg 74 of the L-hoist hoist 64 bears against the bottom surface of the ball piece 16 and pushes the ball piece 16 upward.

As best shown in FIGS. 6–8, the sleeve 14 has an open bottom 76. A vertical slot 78 is provided in the sleeve 14 with is contiguous with the open bottom 76. The raising leg 74 of the L-hoist 64 contacts the bottom surface of the shank 52 through this open bottom 76 and vertical slot 78. Thus, the open bottom 76 and the vertical slot 78 allow the raising/lowering mechanism to be coupled to the ball piece 16 without actually being connected. In this way, the ball piece 16 is free to rotate about its axis during towing of the trailer, and replacement of the ball piece 16 is simple and straightforward without any disengagement of the control linkage.

A raise-assist spring 56 is mounted between the spring attachment location 54 of the bed plate 28 and the raising/lowering mechanism such as at the pin attachment 66. The raise-assist spring 56 biases the raising/lowering mechanism to push the ball piece 16 upward and assist in raising the ball piece 16 to the extended position. In the preferred embodiment, a 25-pound tension spring is used for the raise-assist spring 56.

The only force biasing the ball piece 16 downward is gravity, which either may be due solely to the weight of the ball piece 16 or may include the weight of the tongue of the trailer. Thus, once the retaining collar 46 is removed, the ball piece 16 can be moved upwardly away from the sleeve 14 without disassembly of the control mechanism 18.

With the assistance of the raise-assist spring 56, the handle 36 of the raising/lowering mechanism can move a relatively short distance, such as about 3 to 4 inches, while raising the ball piece 16 a full 4 inches vertically, and still provide considerable mechanical advantage and power in raising of the ball piece 16. In the preferred embodiment, the full stroke movement of the raising/lowering handle 36 from the retracted to the operative position is slightly less than the ball piece travel distance.

At the same time, the only required motion of the raising/lowering handle 36 is one of translation, which can be done quickly and efficiently. No rotation is required. The preferred embodiment, which involves only translation of the two handles 34, 36, can be engaged or disengaged in less than two seconds. If desired, the control mechanism for raising/lowering of the ball piece 16 could include a screw-handle, with the ball piece 16 raised through a screwing action. Additionally, if desired the ball piece 16 could include a cam to facilitate raising and lowering. However, the preferred simple translation mechanism for operation of the raising/lowering control can be operated more quickly, and full engagement is assured because the raise-assist spring 56 propels the ball piece 16 upward until it positively contacts the retaining collar 46.

Figure 5:
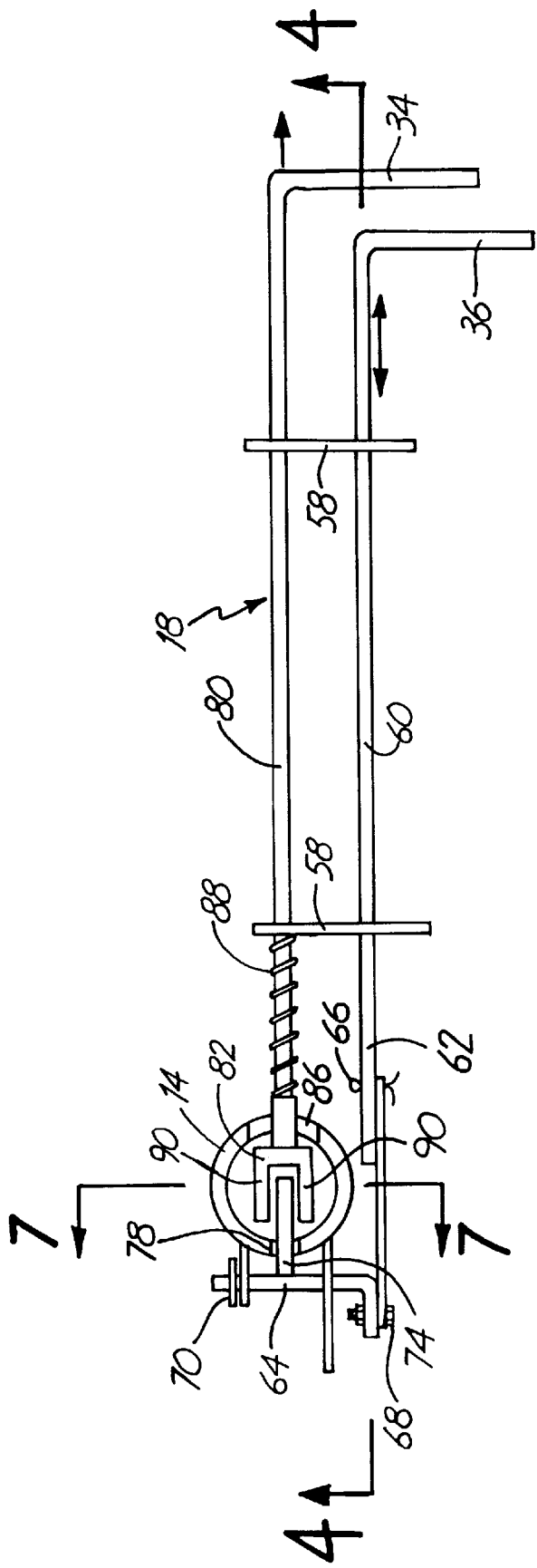
FIG. 5 is a plan view of the trailer hitch of FIG. 1 taken along line 5—5 from FIG. 4.

The positive lock handle 34 is best shown with reference to FIG. 5. The positive lock handle 34 has a bar 80 which terminates in a locking pin 82. The bar 80 is also supported by bearing plates 58. The locking pin 82 extends through an opening 86 in the sleeve 14 to engage the ball piece 16. The locking pin 82 is biased toward a locking position by a compression spring 88, such as a 25-pound compression spring.

In the locking position, the locking pin 82 is received by a recess 84 in the shank 52 to lock the ball piece 16 in the operative, extended position. When the locking pin 82 is retracted by pulling on the positive lock handle 34, the ball piece 16 can be moved upward or downward between the retracted and extended positions. If the ball piece 16 is moved fully downward to the retracted position, the positive lock handle 34 can be released and the locking pin 82 will engage the neck of the ball piece 16 and hold the ball piece 16 downward in the retracted position. Similar to the raising/lowering control linkage, the locking control linkage is disposed beneath the bed plate 28 so as to allow substantially unimpeded access to the ball 50 in the operative position for the engaged coupling mechanism on the trailer.

The preferred locking pin 82 is "U" shaped or horseshoe-shaped. With a horseshoe-shaped locking pin 82, the locking pin 82 is received in a horizontally extending slot 86 in the sleeve 14. This shape of locking pin 82 places two legs 90 on opposite sides of axis of the ball piece 16, providing several advantages. The horseshoe-shaped locking pin 82 naturally mates with the neck of the ball piece 16 for holding the ball piece 16 down in the retracted position. The horseshoe-shape supports the ball piece 16 on both sides of the axis, helping to prevent any wobbling of the ball piece 16 when the locking pin 82 is engaged. Additionally, with a horseshoe-shaped locking pin 82, the receiving recess or locking groove 84 in the shank 52 of the ball piece 16 can be annularly shaped. With a locking groove 84 which extends horizontally 360° around the shank 52, the ball piece 16 can be rotated about its axis without any effect on operation of the locking mechanism. The locking pin 82 can be received by the locking groove 84 regardless of the rotational position of the ball piece 16.

The locking control linkage opening 86 is located on the sleeve 14 on the side opposite the raising/lowering control linkage slot 78. This allows access to the ball piece 16 for both the raising/lowering control and the locking control, without overly weakening one side of the sleeve 14.

Although the present invention has been described with reference to preferred embodiments, workers skilled in the art will recognize that changes may be made in form and detail without departing from the spirit and scope of the invention. For instance, workers skilled in the art will appreciate that many alternative linking arrangements may be provided while still meeting the aims of the present invention.

What is claimed is:

1. A retractable hitch adapted to be mounted to a vehicle for releasably engaging a coupling mechanism secured to a trailer, the hitch comprising:
    a frame secured to a vehicle, the frame providing an upper surface and having an opening extending below the upper surface, the upper surface being substantially flat;
    a ball piece for releasably engaging a coupling mechanism secured to a trailer, the ball piece movably mounted on the frame for movement between an operative position and a retracted position, the ball piece extending above the upper surface when the ball piece is in the operative position, and the ball piece positioned below the upper surface when the ball piece is in the retracted position;
    a raising/lowering control for moving the ball piece between the operative position and the retracted position, the raising/lowering control being mechanically coupled to the ball piece through a raising/lowering control linkage which translates to move the ball piece, the raising/lowering control linkage disposed so as to allow substantially unimpeded access to the ball piece in the operative position for the engaged coupling mechanism on the trailer; and
    a locking control for selectively locking the ball piece in the operative position, the locking control being mechanically coupled to the ball piece through a locking control linkage disposed so as to allow substantially unimpeded access to the ball piece in the operative position for the engaged coupling mechanism on the trailer.

2. The retractable hitch of claim 1, wherein the ball piece comprises:
    a spherical portion for engaging a coupling mechanism secured to a trailer; and
    a shank portion below the spherical portion in the operative position, wherein the shank defines a shank axis which is substantially vertical in the operative position, and wherein the ball piece is rotatable about the shank axis in the operative position.

3. The retractable hitch of claim 1 adapted to be mounted in a truck bed for releasably engaging a coupling mechanism of a fifth wheel goose neck trailer, wherein the raising/lowering control has a raising/lowering control handle which extends to a control location spaced from the ball piece by an unimpeded access distance, wherein the locking control has a locking control handle which extends to the control location, and wherein the control location is in a wheel well of the truck.

4. The hitch of claim 1, wherein the ball piece moves through a ball piece travel distance between the retracted position and the operative position, and wherein the raising/lowering control handle moves through a control handle travel distance between the retracted position and the operative position which is about equal to or less than the ball piece travel distance.

5. A retractable hitch adapted to be mounted to a vehicle for releasably engaging a coupling mechanism secured to a trailer, the hitch comprising:
    a frame secured to a vehicle, the frame providing an upper surface, the upper surface being substantially flat;
    a ball piece for releasably engaging a coupling mechanism secured to a trailer, the ball piece movably mounted on the frame for sliding movement along a movement axis between an operative position and a retracted position, the ball piece extending above the upper surface when the ball piece is in the operative position, and the ball piece positioned below the upper surface when the ball piece is in the retracted position;
    a sleeve extending vertically below the upper surface and about the movement axis, the sleeve receiving the ball piece in the retracted position, the sleeve having at least one control linkage opening including an open bottom contiguous with a vertical slot in the sleeve; and
    at least one control linkage extending below the upper surface of the frame disposed so as to allow substantially unimpeded access to the ball piece in the operative position for the engaged coupling mechanism on the trailer, the control linkage being in contact with the ball piece through the control linkage opening, the control linkage extending from the ball piece to a control handle.

6. The retractable hitch of claim 5, wherein said at least one control linkage comprises:
    a raising/lowering control for moving the ball piece between the operative position and the retracted position, the raising/lowering control being mechanically coupled to the ball piece through a raising/lowering control linkage disposed so as to allow substantially unimpeded access to the ball piece in the operative position for the engaged coupling mechanism on the trailer.

7. The retractable hitch of claim 6, further comprising:
    a locking control for selectively locking the ball piece in the operative position, the locking control being mechanically coupled to the ball piece through a locking control linkage disposed so as to allow substantially unimpeded access to the ball piece in the operative position for the engaged coupling mechanism on the trailer, the locking control linkage being in contact with the ball piece through a locking control linkage opening in the sleeve, the locking control linkage opening being disposed on the sleeve opposite the control linkage opening for the raising/lowering control linkage.

8. The retractable hitch of claim 7, wherein the raising/lowering control has a raising/lowering control handle which extends to a control location spaced from the ball piece by an unimpeded access distance, and wherein the locking control has a locking control handle which extends to the control location.

9. The retractable hitch of claim 5, wherein the raising/lowering control bears against a bottom surface of the ball piece to support the ball piece upwardly, with the ball piece being gravitationally biased downwardly against the raising/lowering control, such that the ball piece can be moved upwardly away from the raising/lowering control without disassembly from the raising/lowering control.

10. The retractable hitch of claim 9, further comprising a retaining collar releasably secured to the frame, the retaining collar when in place limiting the maximum upward movement of the ball piece.

11. The retractable hitch of claim 5, wherein the control linkage comprises:

a locking control for selectively locking the ball piece in the operative position, the locking control being mechanically coupled to the ball piece through a locking control coupling disposed so as to allow substantially unimpeded access to the ball piece in the operative position for the engaged coupling mechanism on the trailer.

12. The retractable hitch of claim 11, wherein the control linkage opening comprises a horizontally extending slot in the sleeve, wherein the ball piece includes a spherical portion for engaging a coupling mechanism secured to a trailer, and a shank portion below the spherical portion, and wherein the locking control linkage comprises:

a locking pin receivable by the shank to lock the ball piece in the operative position, the locking pin being horseshoe-shaped with two legs disposed on opposite sides of the shank axis when locking the ball piece in the operative position, the locking pin being moveable so as to permit the ball piece to move between the operative position and the retracted position.

13. The retractable hitch of claim 12, wherein the spherical portion of the ball piece is separated from the shank portion by a neck, and wherein the horseshoe shaped locking pin is received around the neck when the ball piece is in the retracted position.

14. A retractable hitch adapted to be mounted to a vehicle for releasably engaging a coupling mechanism secured to a trailer, the hitch comprising:

a frame secured to a vehicle, the frame providing an upper surface and having an opening extending below the upper surface, the upper surface being substantially flat;

a ball piece for releasably engaging a coupling mechanism secured to a trailer, the ball piece movably mounted on the frame for movement between an operative position and a retracted position, the ball piece extending above the upper surface when the ball piece is in the operative position, and the ball piece positioned below the upper surface when the ball piece is in the retracted position, the ball piece including a spherical portion for engaging a coupling mechanism secured to a trailer, and a shank portion below the spherical portion in the operative position, the shank portion defining a shank axis; and a locking pin receivable by the shank to lock the ball piece in the operative position, the locking pin being horseshoe-shaped with two legs disposed on opposite sides of the shank axis when locking the ball piece in the operative position, the locking pin being moveable so as to permit the ball piece to move between the operative position and the retracted position.

15. The hitch of claim 14, wherein the shank portion has a locking groove defined therein which is disposed substantially horizontally when the ball piece is in the operative position, with the locking pin received by the locking groove to lock the ball piece in the operative position.

16. The hitch of claim 15, wherein the ball piece is rotatable about the shank axis, and wherein the shank portion is cylindrical with the locking groove extending around the cylindrical circumference of the shank portion such that the locking pin can be received by the locking groove regardless of the rotational position of the ball piece.

17. The hitch of claim 14, wherein the locking pin is spring biased toward a locking position.

18. A retractable hitch adapted to be mounted to a vehicle for releasably engaging a coupling mechanism secured to a trailer, the hitch comprising:

a frame secured to a vehicle, the frame providing an upper surface and having an opening extending below the upper surface, the upper surface being substantially flat;

a ball piece for releasably engaging a coupling mechanism secured to a trailer, the ball piece movably mounted on the frame for movement between an operative position and a retracted position, the ball piece extending above the upper surface when the ball piece is in the operative position, and the ball piece positioned below the upper surface when the ball piece is in the retracted position;

a raising/lowering control for moving the ball piece between the operative position and the retracted position, the raising/lowering control being mechanically coupled to the ball piece through a raising/lowering control linkage disposed so as to allow substantially unimpeded access to the ball piece in the operative position for the engaged coupling mechanism on the trailer, wherein the raising/lowering control bears against a bottom surface of the ball piece to support the ball piece upwardly, with the ball piece being gravitationally biased downwardly against the raising/lowering control, such that the ball piece can be moved upwardly away from the raising/lowering control without disassembly from the raising/lowering control; and a retaining collar releasably secured to the frame, the retaining collar when in place limiting the maximum upward movement of the ball piece.

19. A retractable hitch adapted to be mounted to a vehicle for releasably engaging a coupling mechanism secured to a trailer, the hitch comprising:

a frame secured to a vehicle, the frame providing an upper surface and having an opening extending below the upper surface, the upper surface being substantially flat;

a ball piece for releasably engaging a coupling mechanism secured to a trailer, the ball piece movably mounted on the frame for movement between an operative position and a retracted position, the ball piece extending above the upper surface when the ball piece is in the operative position, and the ball piece positioned below the upper surface when the ball piece is in the retracted position, the ball piece being mounted on the frame so as to be centrally positioned in a truck bed for releasably engaging a coupling mechanism of a fifth wheel goose neck trailer;

a raising/lowering control for moving the ball piece between the operative position and the retracted position, the raising/lowering control being mechanically coupled to the ball piece through a raising/ lowering control linkage, the raising/lowering control linkage disposed so as to allow substantially unimpeded access to the ball piece in the operative position for the engaged coupling mechanism on the trailer, wherein the raising/lowering control linkage has a raising/lowering control handle which extends to a control location spaced from the ball piece by an unimpeded access distance; and a locking control for selectively locking the ball piece in the operative position, the locking control being mechanically coupled to the ball piece through a locking control linkage disposed so as to allow substantially unimpeded access to the ball piece in the operative position for the engaged coupling mechanism on the trailer, the locking control linkage having a locking control handle which extends to the control location, the locking control linkage extending from the centrally mounted ball piece to the locking control handle, wherein the control location is in a wheel well of the truck.

20. A retractable hitch adapted to be mounted to a vehicle for releasably engaging a coupling mechanism secured to a trailer, the hitch comprising:

a frame secured to a vehicle, the frame providing an upper surface and having an opening extending below the upper surface, the upper surface being substantially flat;

a ball piece for releasably engaging a coupling mechanism secured to a trailer, the ball piece movably mounted on the frame for movement between an operative position and a retracted position, the ball piece extending above the upper surface when the ball piece is in the operative position, and the ball piece positioned below the upper surface when the ball piece is in the retracted position, wherein the ball piece comprises:
  a spherical portion for engaging a coupling mechanism secured to a trailer; and
  a shank portion below the spherical portion in the operative position, wherein the shank defines a shank axis which is substantially vertical in the operative position, and wherein the ball piece is rotatable about the shank axis in the operative position.;

a raising/lowering control for moving the ball piece between the operative position and the retracted position, the raising/lowering control being mechanically coupled to the ball piece through a raising/lowering control linkage, the raising/lowering control linkage disposed so as to allow substantially unimpeded access to the ball piece in the operative position for the engaged coupling mechanism on the trailer; and a locking control for selectively locking the ball piece in the operative position, the locking control being mechanically coupled to the ball piece through a locking control linkage disposed so as to allow substantially unimpeded access to the ball piece in the operative position for the engaged coupling mechanism on the trailer.

* * * * *